United States Patent [19]

Wittman

[11] 4,078,832

[45] Mar. 14, 1978

[54] PIPE COUPLING WITH IMPROVED SEAL MEANS

[75] Inventor: Robert H. Wittman, Houston, Tex.

[73] Assignee: HydroTech International, Inc., Houston, Tex.

[21] Appl. No.: 752,985

[22] Filed: Dec. 21, 1976

[51] Int. Cl.² .............................................. F16L 35/00
[52] U.S. Cl. ........................................ 285/18; 285/96; 285/101; 285/187; 285/375; 277/3; 277/26
[58] Field of Search ................... 285/18, 96, 101, 187, 285/375; 277/26, 3, 27

[56] References Cited

U.S. PATENT DOCUMENTS

| | | | |
|---|---|---|---|
| 3,591,189 | 7/1971 | Tootle et al. | 277/26 X |
| 3,713,675 | 1/1973 | White | 285/96 X |
| 3,986,728 | 10/1976 | Marsh | 285/18 |

FOREIGN PATENT DOCUMENTS

| | | | |
|---|---|---|---|
| 205,423 | 2/1959 | Austria | 285/187 |

Primary Examiner—Wayne L. Shedd

[57] ABSTRACT

A pipeline coupling adapted for mounting over a pipe to which connection is to be made. It includes an annular seal ring of elastomeric material supported by the coupling and adapted for deformation to a confined sealing position between the coupling and the pipe. Means such as a plurality of circumferentially spaced about and hydraulically actuatable pistons are arranged for applying a compressive force to the seal ring to thereby deform the seal ring to the confined sealing position. Means are provided which are operably associated with the seal ring for automatically accommodating increases and decreases in the volume of the confined seal ring to thereby reduce variations in the confined pressure of the seal ring caused by variations in temperature. One form of such automatic means includes springs arranged to apply substantially uniform counter forces to the aforesaid pistons.

4 Claims, 7 Drawing Figures

PIPE COUPLING WITH IMPROVED SEAL MEANS

BACKGROUND OF THE INVENTION a. Field of the Invention

This invention generally relates to pipe couplings of the type which are particularly adapted for underwater connection of pipelines and the like.

The following U.S. patents are generally illustrative of the state-of-the-art of the pipe couplings of the type over which the present invention may be considered an improvement: U.S. Pat. Nos. 3,986,728; 3,977,702; 3,830,526; 3,784,234; 3,713,675; and 3,713,204; for example. All of the aforesaid types of couplings generally utilize elastomeric seals, such as rubber, which are arranged for application of a compressive force thereto for the purpose of deforming the seal to sealing engagement between the pipe and the coupling member.

b. Description of the Prior Art

As the offshore exploration for oil has continued and as oil and hydrocarbon fluids are produced from deeper formations in such offshore locations, the pipe and associated coupling members are thereby exposed to higher temperatures of the fluid being produced and flowed through the pipeline, and to increased variations between the temperature of the fluid passing through the pipeline and the ambient temperature exterior of the pipeline. For example, it is not uncommon for hydrocarbon fluids to flow through such lines at temperatures in excess of 150° F., and on occasion as high as 240° F. In addition, it is not unusual for the flow of such hot materials through such lines to be of a cyclical nature wherein periods of flow are interrupted by periods of non-flow, such that the pipeline and associated coupling members are repeatedly heated and cooled between the elevated temperatures of the flowing fluid and the ambient temperature of the water exterior of the pipeline. It has been found that these extremely high temperatures and the cyclical nature of the temperature to which such pipelines and couplings are exposed present serious problems with maintaining the aforesaid elastomeric seals properly sealed at all times. The result has been that such frequent temperature changes and high temperatures have caused certain prior art couplings utilizing elastomeric seals to fail or perform in a substandard fashion after a relatively short period of time. If the elastomeric seal is compressed and "set" at a low temperature and the temperature is then increased to some higher temperature the differential thermal expansion between the elastomer of the seal and the steel body will cause the pressure in the elastomer to rise. The magnitude of the pressure rise in the elastomer may be so great that yielding of the pipe will occur or the elastomer will extrude out of the gap beteen the connector body and pipe, or both. The magnitude of the pressure rise in the elastomer packer will be directly proportional to the temperature rise and the difference in the thermal expansion of the elastomer and steel body. The pressure rise in the elastomer will be modulated by the elastic compliance of the pipe, the coupling body and the setting mechanism as well as structural changes in the elastomer (i.e., compression set). Where the pipe is thin or of low strength and the temperature change of sufficient magnitude the pipe can be plastically deformed by the external rubber pressure. If such permanent deformation occurs, a subsequent return of the temperature to the initial condition will cause a permanent loss of the original setting pressure.

Elastomeric materials such as Nitrile rubber expand or increase in volume at a near linear relationship with increases in temperature, particularly above about 150° F. and up to about at least 250° F. Once rubber reaches this temperature range, it does not contract to the same temperature pressure relationship of its original condition if the internal pressure of the rubber goes too high. With excessive temperatures, such as are now encountered in some sub-sea pipeline connector seals, there is a permanent loss in elastic property in the seal material. It has been determined that when the elastomeric packings of the prior art type are subjected to relatively high elevations in temperature in the range heretofore mentioned, excessive pressures develop within the seal and there is an increase in the volume of the packing and a decrease in the viscosity or an increase in the tendency of the rubber to flow. Excessive pressure causes such rubber packings to extrude into the annular space between the pipe and the coupling and out of the confined space in which they are initially held in the sealed position. In addition, the increased volume caused by thermal expansion, unless relieved, may also cause damage to the pipeline at the point of the seal. Upon subsequent cooling of the rubber, the pressure exerted in the confined area is somewhat less than the original and necessary setting pressure because of such loss of rubber and loss of elastic property in the rubber thereby causing the seal to leak.

SUMMARY OF THE INVENTION

It is therefore an object of this invention to provide a pipe coupling of the type arranged for mounting over a pipe to which the connection is to be made and which incorporates improves seal means for accommodating or otherwise overcoming the aforesaid problems. In this invention, means are provided to limit the maximum pressure that can occur within the seal ring.

Briefly stated, this invention is for a pipe coupling of the type which is adapted for mounting over a pipe to which connection is to be made. It includes the combination of an annular seal ring of an elastomeric material supported by the coupling and adapted for deformation, such as axial deformation, to a confined sealing position between the coupling and the pipe in response to compression thereof. The invention includes means for applying a compressive force to the seal ring to thereby deform the seal ring to the confined sealing position. Such force applying means may be in the form of discrete hydraulically actuated pistons, for example. The invention also includes means operably associated with the seal ring for automatically accommodating increases and decreases in the volume of the confined seal ring to, thereby reduce variations in the confined pressure of the seal ring caused by variations in temperature, with the result that confined pressure in the seal is maintained at a more uniform and safe level. Preferably, the means for automatically accommodating increases and decreases in the volume is responsive to variations in the confined volume of the seal ring caused by the aforesaid variations in temperature. Certain embodiments of the invention may include barrier means mounted at each axial end of the seal ring for retarding extrusion of the seal ring therepast and along the annular space between the coupling and the pipe.

In certain embodiments, the means for applying the aforesaid compressive force may include axially movable thrust means, such as pistons, mounted axially adjacent one axial end of the seal ring for applying axial force to the seal ring, to thereby move the seal ring to the confined sealing position. In such cases, the means for accommodating variations in the volume of the confined packer ring may include means for accommodating variations in the axial displacement of the aforesaid thrust means relative to the seal ring.

DESCRIPTION OF THE PREFERRED EMBODIMENTS

Figure 1:
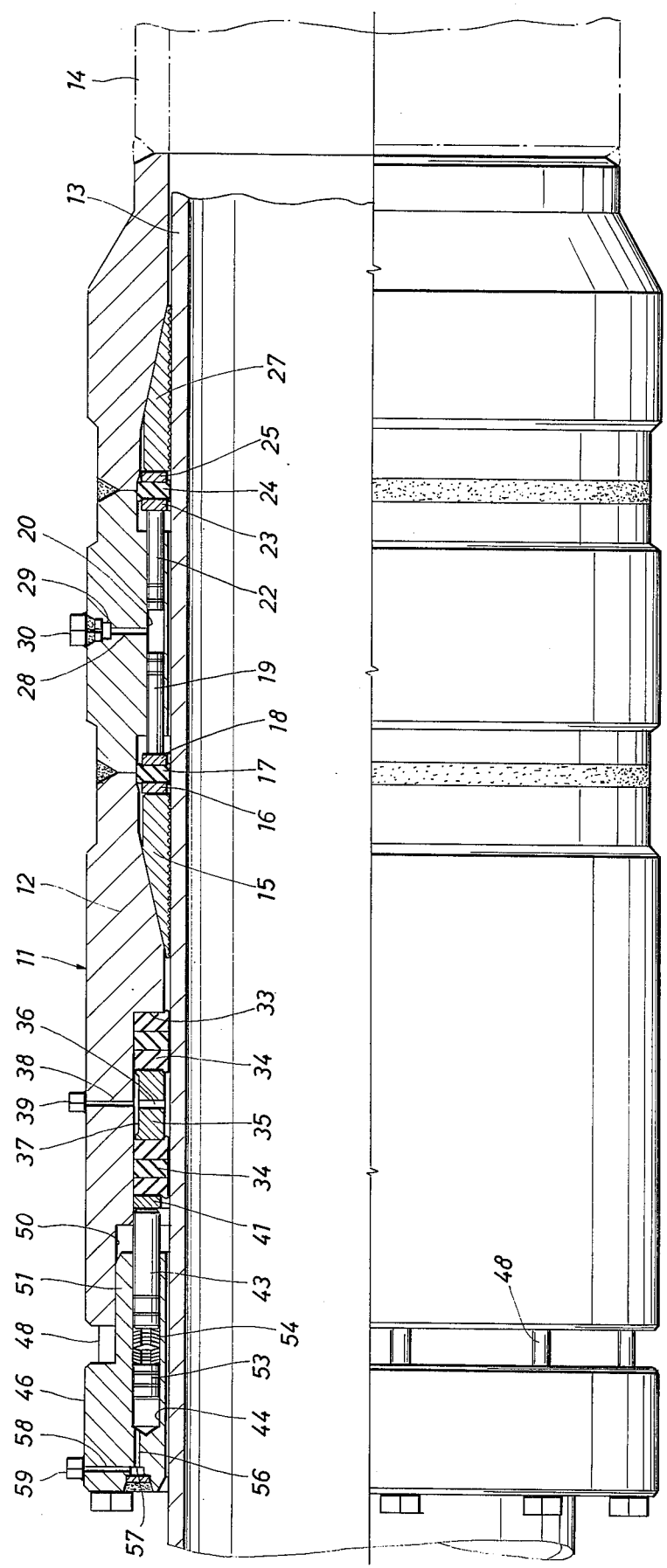
FIG. 1 is a central sectional view of one embodiment of the invention showing the seal means in the sealing position.

Referring now to FIG. 1, the numeral 11 generally designates a coupling in which one form of the present invention is embodied. Coupling 11 is comprised of a coupling body 12 which is of a generally tubular construction and arranged for overfitting of pipe 13 to which the connection is to be made, which pipe is arranged for telescopic movement into the left end of the body 12 as viewed in FIG. 1. The right end of body 12 as shown in FIG. 1 is attached to sub 14 which in turn may be connected to other connecting means such as flanges, ball joints or the like, which in turn may be connected to another pipe axially spaced apart.

Coupling 11 may include the conventional pipe gripping means such as a plurality of circumferentially spaced about tapered and axially movable compression slips 15 which are mounted radially adjacently a matching tapered surface formed on the inside of body 12. The right end of slips 15 as shown in FIG. 1 are arranged for abutment by compression ring 16 which in turn is abutted by an elastomeric packer ring 17 which in turn is abutted by another compression ring 18 which in turn is arranged for application of an axial force thereto by means of a plurality of circumferentially spaced and axially aligned pistons 19 mounted in a similar plurality of circumferentially spaced and axially aligned cylinders 20.

Each cylinder 20 also has co-axially mounted therein another piston 22 which is arranged to transmit an axial force in the opposite direction and against a compression ring 23 which in turn abuts against a packer ring 24 which abuts another pressure ring 25 which in turn abuts the end of another plurality of circumferentially spaced tapered tension slips 27 which are arranged for sliding engagement with a tapered bowl surface provided in coupling 12.

Each of the cylinders 20 is communicated with by a conduit 28 provided in body 12 and which connect with an annular manifold conduit 29 which in turn is connected to an adaptor 30 for attachment of a pressurized fluid source such as pressurized hydraulic fluid. Hence, upon application of hydraulic pressure through conduits 28 to cylinders 20, pistons 19 and 22 are urged axially apart, thereby axially compressing packer rings 17 and 24 and applying axial force to slips 15 and 27 to force the same into engagement with the external surface of pipe 13. The foregoing gripping means are generally old in the art and have merely been described herein for the purpose of showing how the present sealing means may be incorporated in a pipe coupling.

Referring now more particularly to the left end of coupling 11 as shown in FIG. 1, the improved seal means of this invention will now be described. The left end of coupling body 12 is provided with a radially enlarged portion to form annular shoulder 33 which has mounted therein and shown in the set position a plurality of packer rings 34 of an elastomeric material such as Nitrile rubber. Packer rings 34 may have interposed therebetween an axially movable test ring 35 having a plurality of radial ports 36 therethrough and annular recess 37 about the external surface thereof which forms a channel which communicates with conduit 38 provided in body 12 and which connects with adaptor 39 which is arranged for connection to a source of pressurized fluid. Hence, when packer rings 34 are axially compressed to the confined sealing position shown in FIG. 1, the application of fluid pressure through conduit 38 will determine whether or not there has been an effective seal which is resistant to the pressure ranges contemplated for the coupling. Various preferred configurations for packer rings 34 will be described hereinafter. However, for purposes of convenience, packer rings 34 may be referred to collectively as annular seal ring.

The left end of the group of packer rings 34 is arranged for abutment by an annular thrust ring 41 which in turn is arranged for axial abutment by a plurality of circumferentially spaced and axially movable pistons 43, each of which is mounted in an axially extending cylinder 44, which cylinders are provided in thrust flange 46 which is arranged for attachment to body 12 by means of a plurality of axially extending bolts 48 which are threadably engaged in the end portion of body 12, as shown. Coupling body 12 has a further radially enlarged bore at the extreme left end thereof as shown in FIG. 1, which enlarged bore is designated by the numeral 50. Bore 50 is arranged to receive a radially reduced portion 51 of thrust flange 46 in mating engagement therewith.

Each cylinder 44 also has co-axially mounted therein another piston 53 which is axially spaced from piston 43. Pistons 53 and 43 have mounted therebetween spring means in the form of two opposed stacks of Belleville washers 54 having axial openings therethrough and being of a diameter slightly less than that of cylinders 44 and are arranged for transmitting axial forces between pistons 43 and 53. Pistons 43 and 44 are provided with appropriate O-ring seals thereabout for effecting fluid seals with the cylinder 44.

Each of the cylinders 44 communicate with an axially extending conduit 56 which in turn connects to an annular conduit 57 which in turn communicates with one or more radial ports 58 each of which is connected to an adaptor 59 which is arranged for attachment of a hydraulic line for the application of pressurized hydraulic fluid through ports 58, conduit 57 and conduit 56 to the ends of cylinders 44.

Upon application of pressurized hydraulic fluid to cylinders 44, pistons 53 are urged axially to the right, as shown in FIG. 1, which in turn transmits a thrust force through washers 54, thereby urging pistons 43 to the right which in turn abutt against thrust ring 41 thereby axially compressing and radially deforming packer rings 34 to a confined sealing position shown in FIG. 1, which confinement is provided by the external surface of pipe 13 and the internal surface of body 12 between shoulder 33 and thrust ring 41.

In operation, coupling 11 is initially telescopically mounted over the end of pipe 13, with slips 15 and 27 in retracted and non-actuated position, and with pistons 53 and 43 in the retracted position, such that packer rings 34 are in the non-sealing position and thereby provided with a sufficiently large axial bore therethrough to freely receive pipe 13 therethrough. Thus mounted, slips 15 and 27 are thereafter actuated by the application of hydraulic fluid to cylinders 20 thereby extending pistons 19 and 22, causing axial forces to be applied to slips 15 and 27, thereby urging the same axially and radially along the adjacent bowl surfaces into gripping engagement with the external surface of pipe 13. Packer rings 17 and 24 serve mainly for the purposes of providing stored energy to exert a constant biasing urging slips 15 and 27 to the set position. If a more permanent type installation is required or desired, then hydraulic fluid may be circulated out of cylinders 20 and subtituted with an epoxy resin of the hardenable type or cement or other hardenable fluids, for example, all inconventional manner.

Once the foregoing gripping of pipe 13 has been accomplished, the seal means are actuated by the application of pressurized hydraulic fluid to cylinders 44 which thereby applies an axial force to pistons 53, washers 54 and pistons 43 which thereby urges thrust ring 41 axially to the right as seen in FIG. 1. As thrust ring 41 moves to the right, packer rings 34 are axially compressed and radially deformed to the sealing position shown in FIG. 1, where they are confined as described above. In moving to the confined sealing position, packers 34 carry and position test ring 35 adjacent to conduit 38 through which pressurized hydraulic fluid may be applied to determine whether or not an effective seal has been made. If it is determined that an effective seal has not been made, then it is possible to replace packer rings 34 by removing bolts 48 and moving thrust flange 46 axially apart from coupling body 12, whereby packer rings 34 may be removed from the axial end of body 12 and replaced with new rings. Once an effective seal has been effected, a hardenable fluid such as epoxy may be substituted in cylinders 44.

Assuming that an effective seal has been made by packer rings 34, the operation of the automatic means for accommodating increases and decreases in the volume occupied by packer rings 34 will now be described. As stated above, when packer rings 34 are confined in the manner shown in FIG. 1 and are thereafter subjected to repeated heating and cooling cycles, certain undesired results occur as described above. Since the elastomeric material of which packer rings 34 are usually made expands and decreases in volume in a near linear relationship with changes in temperature, the result is that excessive sealing pressures may be built up within confined packer rings 34. One result is to have excessive extrusion along the annular space between pipe 13 and body 12 at each end of the packer ring 34. Alternatively, the excess pressure caused by increased temperatures may cause radially inward deformation of pipe 13. In addition, excessive pressure also causes permanent changes in the elastic property of the rubber, as described above.

However, by incorporation of the piston arrangement of pistons 53 and 43 together with washers 54, there is provided means for automatically accommodating increases and decreases in the volume of the confined packer rings 34, which thereby reduces the variations of the confined pressure of packer rings 34 caused by variations in temperature and the adverse effects thereof. Washers 54 accommodate thermal expansion of the packer rings 34 without increasing the "set" rubber pressure in the confined volume. Expansion of the rubber parallel to the axis of the pipe 13 is accommodated by the Belleville spring washers 54 placed in series with the discrete hydraulic actuated pistons 53, 43.

Stated otherwise, as thermal expansion occurs as a result of increased temperatures applied to packer rings 34, the confined volume thereof is allowed to expand by the retraction of pistons 43 against washers 54. Washers 54, being of spring metal, do not have the same expansion co-efficient as packer rings 34 and therefore are more compressible relative to packer rings 34 at the setting pressure ranges. When packer rings 34 are subjected to a lower temperature, the pressure exerted in the confined space occupied by packer rings 34 decreases at which point the spring means provided by washers 54 tends to confine the volume occupied by packer rings 34, thereby maintaining the pressure setting within a more narrow range, thereby eliminating the extreme variations in pressures described above.

While spring means such as the washers 54 are presently considered the preferred means for providing the automatic adjustability for accommodating changes in packer volume, other embodiments are contemplated by this invention. For example, rather than utilizing a relatively non-compressible fluid such as hydraulic fluid in cylinders 44 to effect setting of packer rings 34, a compressible fluid such as gas could be applied thereto, which fluid would not have the same expansion co-efficient with respect to the changes in temperature as do packer rings 34. When gas is used as the setting medium, the washers 54 may not be required since the gas would accommodate the aforesaid expansion. However, there is always the potential for losing gas pressure through a leak and for that reason, spring means such as washers 54 are the preferred type of automatic adjusting means. Moreover, it may be desirable to utilize a hardenable epoxy as a setting medium in cylinders 44 to insure a more permanent installation, in which case mechanical spring means would be more desirable as the adjusting means.

Having provided means for automatically accommodating for variations in the volume of the seal ring caused by temperature changes, it develops that it is desirable to have means for aiding in solving the problem of extrusion of the seal ring discussed above, whereby volumetric changes can be accommodated at one axial end of the seal ring as described above. The incorporation of a metal reinforcing barrier at each end of the packer stack provides this solution. The purpose of this metal barrier is to provide complete packing rubber confinement over a wide range of temperatures and pressures. The metal barrier must be able to move radially inward during packer "setting" and fill the gap between compression ring and pipe O.D. The metal barrier may have any one of several configurations and provide the necessary degree of confinement. Metal barrier configurations found to be effective will be described now.

Figure 5:
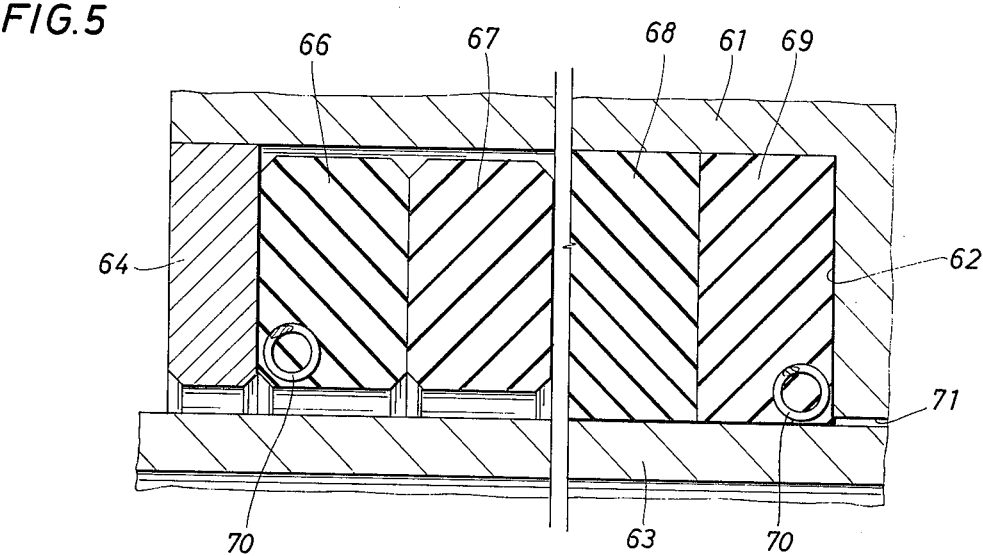
FIG. 5 is a fragmentary view of one form of the seal ring of this invention shown having barrier means provided at end thereof to retard extrusion of the rubber of the packers into the annular space between the pipe and the coupling body, with the left portion of that figure being shown in the non-actuated position and the right half of the drawing being shown in the actuated position.

Accordingly, FIG. 5 shows one embodiment of a seal ring with the improved barrier means of this invention. There coupling body 61 is shown provided with an annular shoulder 62 mounted over pipe 63 to which the connection and with which the seal is to be effected. The left side of FIG. 5 is shown as having a thrust ring 64 mounted therein, which thrust ring may be comparable to thrust ring 41 of the embodiment previously described. The seal ring may be comprised of four packer rings designated by the numerals 66-69. For purpose of convenience, rings 66 and 67 are shown on the left in the unactuated, unsealed position and rings 68 and 69 on the right are shown to the confined or actuated sealing condition. It is to be further understood that the internal rings 67 and 68, for example, may be of somewhat lower Durometer rating, as for example a Durometer rating of 75, as opposed to a Durometer rating of 85 for rings 66 and 69.

It will be also observed that rings 66 and 69 each have embedded in the axially outward end thereof a relatively small diameter coil spring 70 which extends around the full circumference of the packer rings in which they are embedded. Coil springs 70 are resilient but much less subject to deformation than the rubber of which rings 66-69 are composed. Hence, upon deformation to the confined sealing position shown on the right in FIG. 4, coil springs 70 move to the position adjacent to the annular space 71 between body 61 and pipe 63 to thereby provide an effective barrier for preventing unwanted cold flow extrusion therepast, which makes the volumetric adjustment occasioned by variations in temperature more evident against thrust ring 64, the axial movement of which is accommodated by the aforesaid Belleville washers as described, or by other adjusting means.

Figure 6:
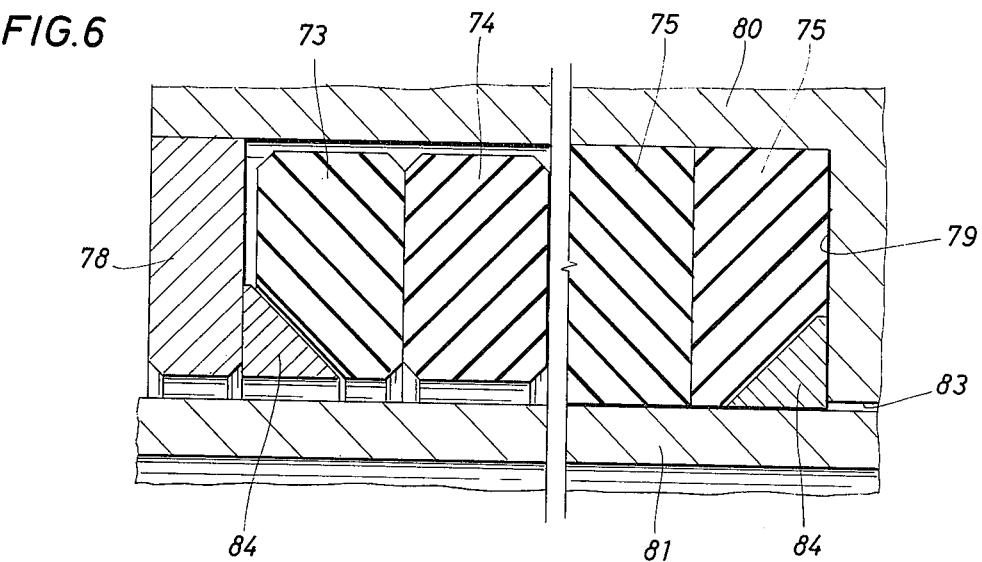
FIG. 6 is a view of an alternative seal ring which is generally similar to that shown in FIG. 4, but showing alternative barrier means.

FIG. 6 shows an alternative barrier means for packer rings 73-76 which are generally similar to packer rings 66-69. Packer rings 73-76 are shown positioned between thrust ring 78, shoulder 79, coupling body 80, pipe 81. In this embodiment, packer rings 73 and 75 have the outer most internal edges thereof relieved to match with a steel ring 84 which is generally diamond shaped in cross section with a 45 degree taper matching the adjacent surface of the adjacent packer ring, as shown. Rings 84 may have a radial thickness greater than annular space 83 and are sufficiently deformable to permit the same to be moved to the blocking position shown on the righthand side of FIG. 6 when packer rings 73-75 are moved to the confined and sealing position as shown on the right. Again, this embodiment of the barrier means effectively reduces extrusion and confines the sealing ring, thereby causing volumetric changes to be more pronounced against thrust ring 78, as with the previous embodiment.

Figure 7:
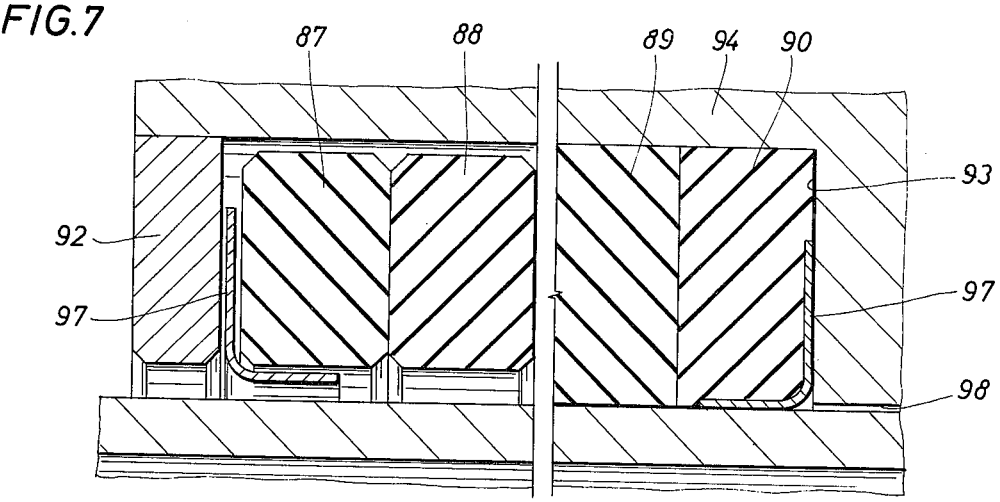
FIG. 7 is a view similar to FIGS. 4 and 5, but showing another alternative barrier means.

Referring to FIG. 7, a still further embodiment of barrier means for the seal ring will be described. In this embodiment, four packer rings 87-90, which are generally similar to packer rings 66-69 and 73-75, are shown confined between thrust ring 92, shoulder 93, coupling body 94 and pipe 95. Packer rings 87-94 are all of the same general cross sectional configuration, but packer rings 87 and 88 are shown in the non-sealing position while rings 89 and 90 are shown in the confined sealing position. In this embodiment, the barrier means is in the form of a deformable steel ring 97 mounted adjacent to the outwardly axial ends of packer rings 87 and 90. Rings 97 are generally L shaped in cross section and are deformable to the extent that the same are moved to the blocking position shown on the right in FIG. 7 upon the setting of packer rings 87-90. So positioned, they prevent extrusion of rubber along the annular space 98 as with the prior embodiment, thereby making volumetric changes in packer rings 87-90 caused by variations in temperature more evident at the point adjacent to thrust ring 92.

Figure 2:
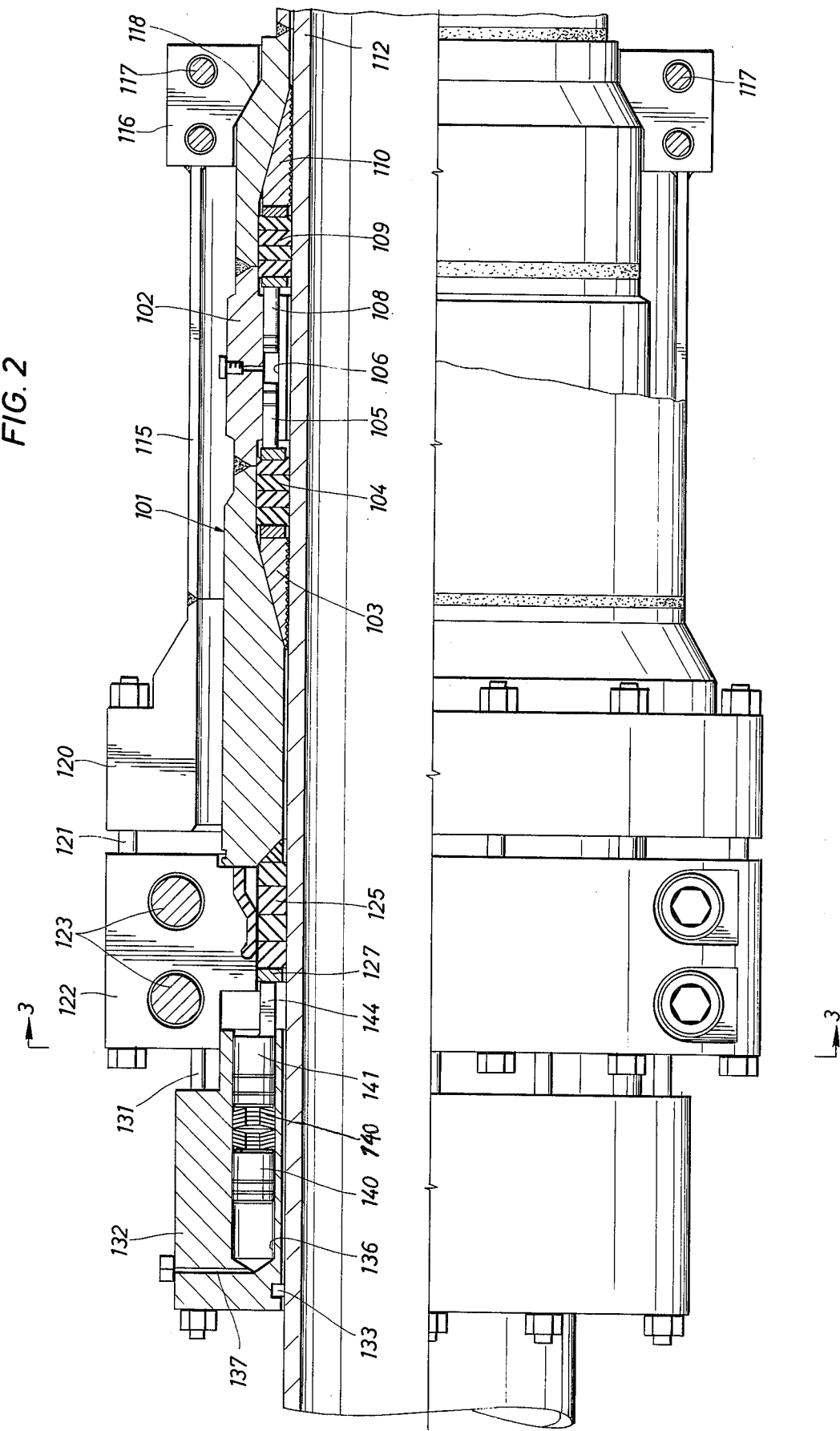
FIG. 2 is a central-sectional view of an alternative embodiment of the invention in the form of a coupling member arranged to provide auxiliary sealing to a previously set coupling, for example.
Figure 3:
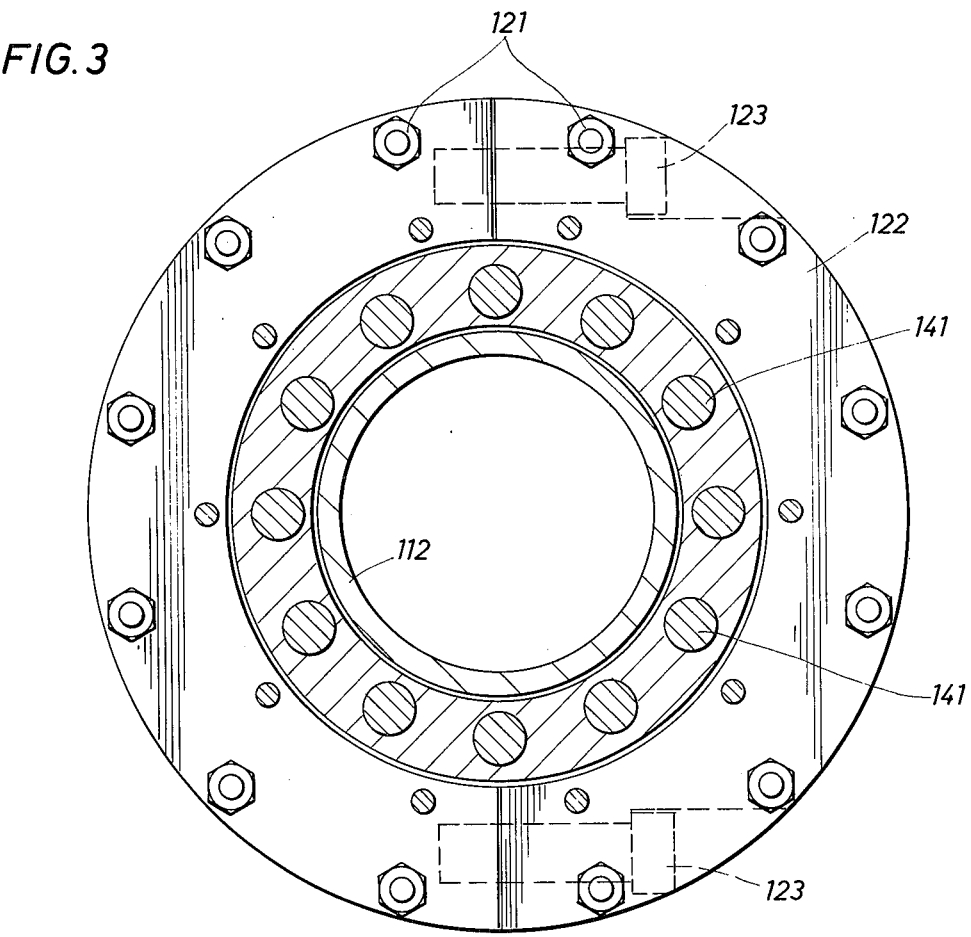
FIG. 3 is a cross-sectional view taken generally along lines 3—3 of FIG. 2.
Figure 4:
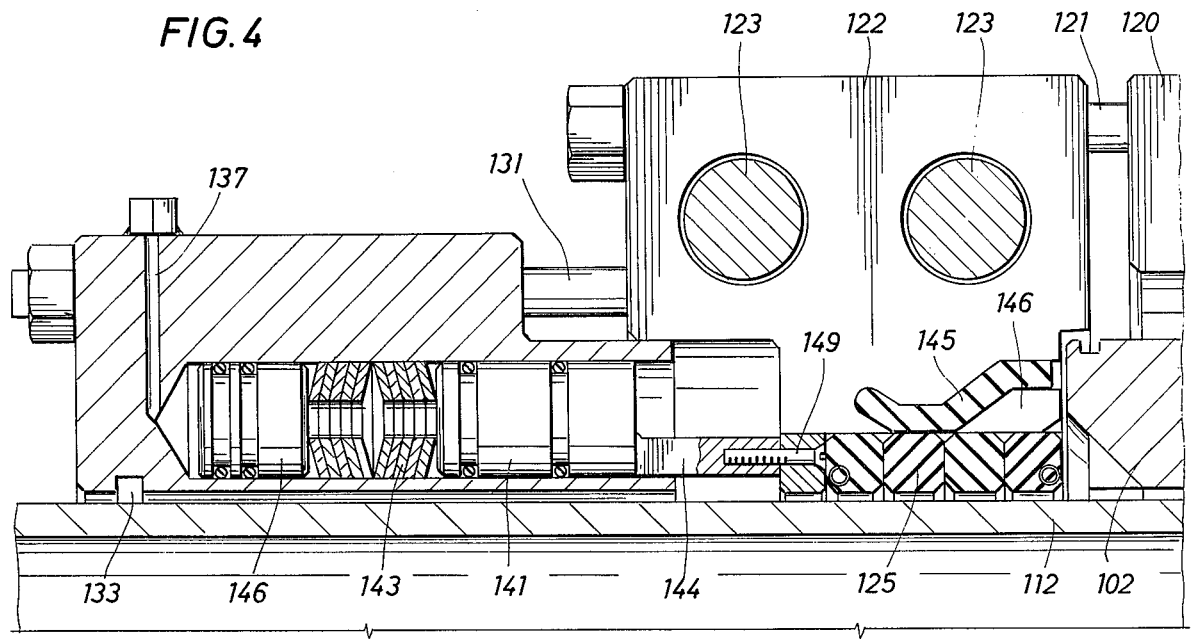
FIG. 4 is an enlarged fragmentary view of the sealing means shown in FIG. 2, but with the seal means in the non-set position.

Referring to FIGS. 2-4 in particular, an alternative embodiment of the means for automatically accommodating increases and decreases in the volume of the confined seal ring will now be described. In certain circumstances, it may be desirable to provide previously installed prior art couplings with additional seal means which are of the type embodying the present invention, whereby couplings can be made to more effectively accommodate wider variations in temperature changes of the type described above. The embodiment of the invention shown in FIGS. 2-4 is one such arrangement for accomplishing this purpose. Referring first to FIG. 2, such a prior art coupling is generally designated by the numeral 101 and is comprised of a coupling body 102 having mounted therein a first plurality of circumferentially spaced and tapered slips 103, a plurality of packer rings 104 which are arranged for actuation to the gripping and sealing position by operation of a plurality of axially movable pistons 105, upon the application of hydraulic fluid or the like to axially extending cylinders 106 as is well known in prior art couplings. Cylinders 106 may have mounted therein another plurality of pistons 108 which are arranged to actuate another group of packer rings 109 and another plurality of tapered slips 110 to engagement with pipe 112, for example. In certain applications, packer rings 104 and 109, for example, may not provide sufficient sealing engagement with pipe 112, or may have become inoperable because of temperature variations discussed above, in which case it may be desirable to provide additional sealing means embodying the present invention to coupling 101.

For such purposes, there is shown an adaptor body 115 which is split longitudinally, the halves of which are arranged for mounting about coupling 101 in the manner shown in FIGS. 2 and 3. The right end of adaptor body 115 has attached therewith portions of a flange which together form a retainer flange 116 the portions of which are arranged for being held together by a pair of bolts 117 on opposed sides thereof. Retainer flange 116 is arranged to engage shoulder 118 provided on coupling body 102 as shown. The other end of adaptor body 115 is provided with a radially outwardly enlarged transfer flange 120 having axially extending bolt holes therethrough which are arranged to receive bolts 121 which pass therethrough and engage packer body 122. Packer body 122 is comprised of two semi-circular halves held together at each side by a pair of bolts 123. Each half of packer body 122 has supported therein a plurality of semi-circular packer rings 125 which become annular when the two halves are mated together as shown in FIGS. 2 and 3. Packer rings 125 are arranged to abutt against the axial end of coupling body 102, as shown, with the opposite end thereof arranged for axial abuttment by thrust ring 127 which is similarly comprised of two semi-circular halves, which together form an annular thrust ring when mounted as shown.

Packer body 122 has attached therewith as by bolts 131 two semi-circular halves of a setting flange 132 which contains the means for actuating packer rings 125 to the confined sealing position and accommodating variations in packer volume caused by variations in temperature as aforesaid. Setting flange 132 has an internal bore which is arranged to fit closely about pipe 112 as shown and may have provided therein a radially movable end seal 133 to effect a water seal therewith to exclude environmental water.

Setting flange 132 also has a plurality of circumferentially spaced and axially extending cylinders 136 which are similar to cylinders 44 of the prior embodiment. Cylinders 136 each connect to a conduit 137 which in turn is connected to a manifold such that hydraulic fluid may be applied thereto as with the prior embodiment. Each cylinder 136 has coaxially mounted therein a pair of pistons, one of which is designated by the numeral 140 and the other of which is designated by the numeral 141, but each of which is provided with conventional O-ring seals thereabout to effect fluid seals with cylinder 136. There is mounted between each pair of pistons 140 and 141 two stacks of opposed Belleville washers 143 which are similar to washers 54 of the prior embodiment. The axially forward end of pistons 141 each have a piston rod 144 which are arranged to abutt against and are attached by screws 149 to thrust ring 127, as shown in FIG. 4.

Upon application of pressurized hydraulic fluid through conduits 137, pistons 140 and 141 and washers 143 are moved to the right as shown in FIGS. 2 and 4 thereby causing piston rods 144 to apply an axial force to thrust ring 127, thereby moving packer rings 125 to the confined sealing position with the external surface of pipe 112. Thereafter, variations in volume of packer rings 125 caused by variations in the temperature are accommodated by the axial compression and expansion of washers 143, as with the prior embodiment.

In certain design situations, it may be desirable to provide additional seal means in the form of a generally tubular seal 145 which is spaced radially outwardly from packer rings 125 and is arranged for being held in place by an annular ring 146. Upon radial compression of packer rings 125, as aforesaid, seal 145 is arranged to provide additional sealing to the adjacent end of coupling body 102 as shown. As with the prior embodiment, packer rings 125 may have associated therewith barrier means such as coil springs 70 of the type discussed in connection with FIG. 5. Other alternative volumetric adjustment means may be utilized, rather than the Belleville washers 143. In any event, the embodiment shown in FIGS. 2-4 provides a coupling with means for automatically accommodating increases and decreases in the volume of the confined seal ring to thereby reduce variations in confined pressure of the seal ring caused by variations in temperature as discussed above.

Further modification and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a pipe coupling adapted for mounting over a pipe to which connection is to be made, the combination comprising:

an annular seal ring of elastomeric material supported by said coupling and adapted for radial deformation to a confined sealing position between said coupling and said pipe in response to axial compression thereof;

means for applying an axial force to said seal ring to thereby axially compress and radially deform said seal ring to said confined sealing position including a thrust ring in contact with the seal ring, said means for applying axial force including a portion of said housing axially spaced from said thrust ring and having a plurality of axially extending circumferentially spaced about cylinders;

a pair of pistons co-axially mounted in each of said cylinders and adapted for movement toward said thrust ring in response to the application of hydraulic fluid to the rearward end of the rearward most one of said pair of pistons;

each of said most forwardly ones of said pairs of pistons having means for engaging said thrust ring and applying axial force thereto when hydraulic fluid is applied as aforesaid to said rearward pistons;

spring means interposed between the pistons of each pair of pistons to permit automatic retraction and extension of said most forwardly ones of said pairs of pistons and said thrust ring in response to variations in the confined volume of said seal ring caused by variations in the temperature of said seal ring;

and means for applying hydraulic fluid to said pistons as aforesaid to initially move said seal ring to said confined sealing position.

2. The invention as claimed in claim 1 wherein:

said spring means includes at least one Belleville washer co-axially mounted between the pistons of each pair of pistons.

3. The invention as claimed in claim 1 including:

barrier means mounted at each axial end of said seal ring for retarding extrusion of said seal ring therepast and along the annular space between said coupling and said pipe, whereby said temperature variation induced volumetric changes of said seal ring are more greatly evidenced at the force applied end surface of said seal ring.

4. In a pipe coupling adapted for mounting over a pipe to which connection is to be made, the combination comprising:

an annular seal ring of elastomeric material supported by said coupling and adapted for radial deformation to a confined sealing position between said coupling and said pipe in response to axial compression thereof;

means for applying an axial force to said seal ring to thereby axially compress and radially deform said seal ring to said confined sealing position including a thrust ring in contact with the seal ring, said means for applying axial force including a portion of said housing axially spaced from said thrust ring and having a plurality of axially extending circumferentially spaced about cylinders;

a pair of pistons co-axially mounted in each of said cylinders and adapted for movement toward said thrust ring in response to the application of pressure to the rearward end of the rearward most one of said pair of pistons;

each of said most forwardly ones of said pairs of pistons having means for engaging said thrust ring and applying axial force thereto when pressure is applied as aforesaid to said rearward pistons;

spring means interposed between the pistons of each pair of pistons to permit automatic retraction and extension of said most forwardly ones of said pairs of pistons and said thrust ring in response to variations in the confined volume of said seal ring caused by variations in the temperature of said seal ring;

and means for applying pressure to said pistons as aforesaid to initially move said seal ring to said confined sealing position.

* * * * *